F. G. FARR.
CONTROLLING VALVE FOR HYDRAULIC OIL DELIVERY SYSTEMS.
APPLICATION FILED OCT. 8, 1917.

1,286,971.  Patented Dec. 10, 1918.

Inventor
Frederick G. Farr

By Whittemore Hulbert & Whittemore
Attorneys

UNITED STATES PATENT OFFICE.

FREDERICK G. FARR, OF DETROIT, MICHIGAN, ASSIGNOR TO HYDRAULIC OIL SYSTEMS CORPORATION, OF DETROIT, MICHIGAN, A CORPORATION OF MICHIGAN.

CONTROLLING-VALVE FOR HYDRAULIC OIL-DELIVERY SYSTEMS.

1,286,971.     Specification of Letters Patent.    Patented Dec. 10, 1918.

Application filed October 8, 1917. Serial No. 195,310.

*To all whom it may concern:*

Be it known that I, FREDERICK G. FARR, a citizen of the United States of America, residing at Detroit, in the county of Wayne and State of Michigan, have invented certain new and useful Improvements in Controlling-Valves for Hydraulic Oil-Delivery Systems, of which the following is a specification, reference being had therein to the accompanying drawings.

The invention relates to systems for hydraulically delivering oil, and it is the object of the invention to obtain a construction which avoids danger of discharge of the oil through leakage of the displacement liquid. It is a further object to obtain a simple construction by which a single valve controls both inlet and discharge of the displacement fluid.

Figure 1:
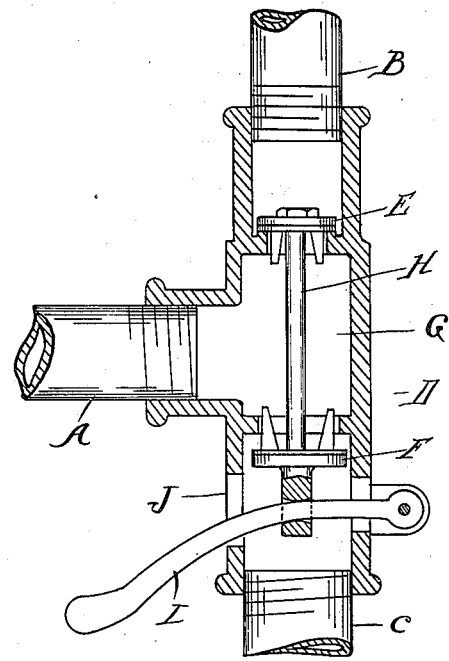
Figure 1 is a longitudinal section through the valve.
Figure 2:
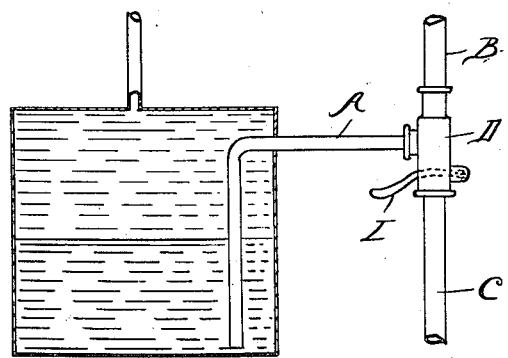
Fig. 2 is a diagram of the valve in connection with a hydraulic oil delivery system.

A is a conduit through which the displacement liquid is introduced and drawn off from the tank or receptacle, B is the water supply pipe and C is the waste water discharge pipe. These pipes B and C are connected to the pipe A through the medium of a valve D. This valve is provided with two disks E and F respectively controlling communication between the conduits B and C and a central chamber G in the valve casing. H is a common stem connected to the valves E and F, and I is an actuating lever for lifting said stem.

Normally the pressure of liquid in the conduit B is sufficient to hold the valve E to its seat, and in this position the valve F is removed from its seat so as to open communication between the chamber G and the discharge conduit C. This discharge conduit is arranged to receive any leakage which may pass the valve E without permitting it to enter the conduit A. On the other hand, when the lever I is lifted the valve F will be forced to its seat, while the valve E will be raised from its seat to admit liquid from the conduit B into the chamber G. The liquid thus admitted is compelled to pass into the conduit A, from which it passes into the tank and displaces the oil therefrom.

With the construction described there is no possibility of accidentally discharging oil through leakage of the displacement fluid. This has been a serious defect in certain systems that have heretofore been used for the reason that a small leak, if it finds access to the tank, will gradually displace the oil and in time occasion a considerable waste. With my improvement whatever leakage may occur will fall directly into the discharge conduit C and therefore cannot find access to the conduit A.

It will be noted that the lever I passes through an aperture J in the valve D into engagement with the stem H. This aperture J forms an air vent which will effectually prevent siphonage of water from the conduit C into the conduit A. It will be further observed that the weight of the lever, valve stem and valve is constantly operating to close the inlet valve E, and the weight of the water against said valves will operate in the same direction. The whole construction is therefore one which will effectually prevent the accidental discharge of oil through any cause.

What I claim as my invention is:

1. A control valve, comprising a casing having a chamber therein with an inlet passage communicating with its upper end, a discharge passage communicating laterally therewith and a waste passage communicating with the lower end, valves for controlling the inlet and waste passages respectively seated in said casing above and below said lateral discharge passage, a common stem connecting said valves, and a lever for actuating said stem to operate the valves, extending into said waste passage through an aperture in said casing, said aperture also constituting a vent passage.

2. In a hydraulic storage and delivery system, the combination with a tank, of a valve casing, a pipe laterally communicating with said valve casing and extending to said tank for alternatively supplying a displacement fluid to said tank and delivering it therefrom, and vertically alined supply and drain pipes for the displacement fluid in communication with said casing, and connected valves within said casing for alternatively closing communication therewith of said supply and drain pipes, whereby any leakage when the supply pipe valve is closed will find direct escape through said drain pipe.

3. A control valve comprising a casing having a chamber therein with an inlet passage communicating with its upper end, a discharge passage communicating laterally therewith, and a waste passage communicating with the lower end, means within said casing for alternatively closing communication of said inlet and waste passages therewith, and an operating lever for said means extending into said waste passage through an aperture in said casing, said aperture also constituting a vent passage.

In testimony whereof I affix my signature.

FREDERICK G. FARR.